United States Patent [19]

Fischer

[11] Patent Number: 5,794,519
[45] Date of Patent: Aug. 18, 1998

[54] BREWING HEAD FOR COFFEE PORTION CAPSULES OF AN ESPRESSO MACHINE

[75] Inventor: Daniel Fischer, Romanshorn, Switzerland

[73] Assignee: Eugster/Frismag AG, Romanshorn, Switzerland

[21] Appl. No.: 648,160

[22] PCT Filed: Sep. 12, 1995

[86] PCT No.: PCT/EP95/03581

§ 371 Date: Jul. 12, 1996

§ 102(e) Date: Jul. 12, 1996

[87] PCT Pub. No.: WO96/08990

PCT Pub. Date: Mar. 28, 1996

[30] Foreign Application Priority Data

Sep. 22, 1994 [DE] Germany ............... 94 15 374 U

[51] Int. Cl.$^6$ .............................. A47J 31/40; A47J 31/06
[52] U.S. Cl. .............................. 99/295; 99/302 R
[58] Field of Search .................. 99/289 T, 295, 99/302 R, 302 P

[56] References Cited

U.S. PATENT DOCUMENTS

| 2,968,560 | 1/1961 | Goros | 99/295 |
|---|---|---|---|
| 3,295,998 | 1/1967 | Goros | 99/295 X |
| 3,403,617 | 10/1968 | Lampe | 99/295 |
| 3,470,812 | 10/1969 | Levinson. | |
| 3,824,913 | 7/1974 | Herman et al.. | |
| 5,649,472 | 7/1997 | Fond et al. | 99/295 |

FOREIGN PATENT DOCUMENTS

| 0102125 | 3/1984 | European Pat. Off. . |
|---|---|---|
| 0465877 | 1/1992 | European Pat. Off. . |
| 0521397 | 1/1993 | European Pat. Off. . |
| 1410288 | 8/1965 | France . |
| 94/02059 | 2/1994 | WIPO . |

*Primary Examiner*—Reginald L. Alexander
*Attorney, Agent, or Firm*—Spencer & Frank

[57] ABSTRACT

A brewing head includes a lower brewing head part having a first recess and a coffee discharge conduit formed therein. An upper brewing head part has a second recess and a hot water conduit formed therein. The upper brewing head part is pivotable to a closed position in which the first recess and the second recess form a receptacle that receives a coffee portion capsule. A plurality of hollow needles are attached to the upper brewing head part, and are in fluid communication with the hot water conduit. The needles project into the receptacle and are penetratable into a top side of the coffee portion capsule for delivering hot water from the hot water conduit into an interior of the coffee portion capsule when the upper brewing head part is in the closed position. A pyramid plate is located within the first recess and has a plurality of projections formed thereon, and a plurality of discharge holes formed therethrough that communicate the receptacle with the coffee discharge conduit. The projections punch holes through a lower side of the coffee portion capsule, so that the hot water together with dissolved coffee components are discharged through the discharge holes and the coffee discharge conduit, respectively. An ejector device is located within the upper brewing head part for ejecting a used coffee portion capsule.

8 Claims, 4 Drawing Sheets

BREWING HEAD FOR COFFEE PORTION CAPSULES OF AN ESPRESSO MACHINE

BACKGROUND OF THE INVENTION

The invention relates to a brewing head of an espresso machine to be loaded with coffee portion capsules, the machine having a lower brewing head part and an upper brewing head part that can be pivoted relative thereto, the two parts forming between themselves a receptacle for one of the coffee portion capsules, with a hot-water conduit being configured in the upper part which branches into a plurality of hollow needles with which the film forming the top side of the capsule can be penetrated so that the hot water can flow through the interior of the capsule to its underside, where the hot water, with dissolved coffee components, leaves the capsule via openings punched into the film by inwardly-pointing tips of a pyramid plate as soon as the water pressure exceeds the film's resistance to tearing, and subsequently exits the brewing head through discharge holes in the pyramid plate and a collection conduit.

European Patent Application 93 914 582.7 describes an apparatus of this type for preparing hot beverages, particularly espresso coffee, in which the ground coffee is located in a capsule formed by two spherical pieces of film welded together to be pressure-tight.

The capsule is inserted into a special apparatus, a two-part brewing head that can pivot outwardly. The outwardly-pivotable upper part of the brewing head has on its inside a plurality of needle tips that are provided with bores and lateral exit holes for water supply. The bottom part of the brewing head is equipped on its inside with a plurality of truncated pyramids that are separated from each other by conduits provided with discharge bores which penetrate the bottom part.

When the brewing head is closed, the needle tips penetrate the upper spherical piece of film forming the capsule. At the same time, the upper part of the brewing head presses the capsule onto the truncated pyramids.

The closing of the brewing head also causes the welded collar of the two pieces of foil of the capsule to be clamped between the bottom part and top part such that brewing water entering the capsule by way of the needles can only flow through the capsule, not around it.

This causes the water, which is under high pressure (10 to 15 bar), to press the underside of the capsule securely into the truncated pyramid geometry. If the film's resistance to tearing is exceeded, the capsule tears at the edges of the truncated pyramids, and the brewing water, with the dissolved coffee components, flows by way of the bottom conduits and the discharge holes into the collection vessel located beneath the brewing head.

The time between the entrance of the brewing water and the tearing of the capsule is critical for the quality of the espresso and, most importantly, for the formation of the cream typical of espresso, and is therefore essential to the above-described invention.

This apparatus has the following advantages:
1. The ground coffee metered precisely in portions into the capsule can be stored aroma-tight for an extended period of time or be available for use.
2. The method guarantees uniform, good brewing results and the typical cream.
3. The disposal of the used capsule is non-problematic and clean.

However, in the above embodiment, this apparatus also has various disadvantages:

1. Due to its movable suspension, the pivotable upper part of the brewing head is not thermally connected to the hot water generator, a consequence of which is that it is heated by brewing water during the brewing process, which leads to a drop in the water temperature, that is, the brewing temperature, and therefore to a decrease in the quality of the brew.
2. When the brewing head is opened following preparation of espresso, the used capsule remains hanging on the needles of the pivoted-out upper brewing head part, and impedes the removal to be undertaken manually.

SUMMARY OF THE INVENTION

The object of the invention is therefore to provide means with which the used portion capsules can be ejected from the brewing head and possibly disposed of, and to ensure, with suitable means, that the espresso brewed with the first portion capsule, that is, when the brewing head, particularly the upper part, is at room temperature, is already of outstanding quality.

To accomplish the first partial object mentioned above, the invention is characterized by the provision of an ejector in the upper part of the brewing head that ejects the used capsule from the needle assembly. The ejector is operated directly or indirectly by hand.

Preferably an arrangement is provided in which the ejector automatically ejects the used portion capsule from the upper part by means of a spring located in the upper brewing head part when the upper part pivots outwardly, without necessitating further handling.

It is preferable for the lever pivotably attached to the upper part to lock the two parts of the brewing head together in the closed position.

Several options exist for accomplishing the second partial object. In this respect, it is proposed for all parts of the upper brewing head part and/or the lower brewing head part that come in contact with the hot water to comprise a thermally poorly-conducting material. With this measure, practically all of the thermal energy of the flowing hot water enters the capsule, and ensures superior quality of the brewed coffee or espresso.

A second option for accomplishing the partial object in accordance with the object is for all parts of the upper part and/or the lower part that come into contact with the hot water to have the lowest possible thermal capacity and to be thermally separated from heat-conducting structural elements of the upper or lower part by means of insulation. The parts having the low thermal capacity therefore absorb only a very small amount of thermal energy from the hot water, and consequently accomplish the above-mentioned, second partial object of the invention.

A third option for accomplishing the object according to the invention is to provide the upper and/or lower brewing head part with a separate heating element that is preferably configured as an electric heating element. With this measure, it is possible to pre-heat the upper and/or lower part to the desired temperature.

It is also possible to implement the three above-mentioned options for accomplishing the second partial object in random combination with each other.

It is pointed out here that the features for accomplishing the second partial object can be provided independently features of the which are directed toward accomplishing the first partial object.

One aspect of the first partial object is directed toward automatically disposing of the used portion capsule, that is, supplying it to a suitable waste container or the like, by pivoting the upper part upwardly, without having to touch the used portion capsule by hand. This was not included in the prior art mentioned at the outset; in that instance and in general, the used, still-hot portion capsule has to be lifted out of the needle cushion and disposed of.

To accomplish this partial object, measures are proposed with which, at the same time the upper part is pivoted upwardly, the used portion capsule is likewise pivoted upwardly into an inclined position such that the portion capsule then falls out of its carrier, preferably out of an expeller implement, and down into a suitable waste container. This means that the used portion capsule need no longer be touched by hand; this process is performed in combination with the upward pivoting of the upper brewing head part, so that a fresh portion capsule can subsequently be inserted into the carrier and the arrangement can be pivoted back down into its operating position.

In this operating position the upper part is to be locked with the lower part; suitable and preferred measures are likewise proposed for this.

For ergonomic reasons, it is preferred that the locking latch be pivotable relative to the locking lever, again preferably following a dead motion.

It is mentioned here that the measures outlined above can be provided independently of the other foregoing features.

BRIEF DESCRIPTION OF THE DRAWINGS

The invention is described in detail below by way of embodiments from which further, crucial features ensue. Shown are in.

DETAILED DESCRIPTION OF THE INVENTION

Figure 1:
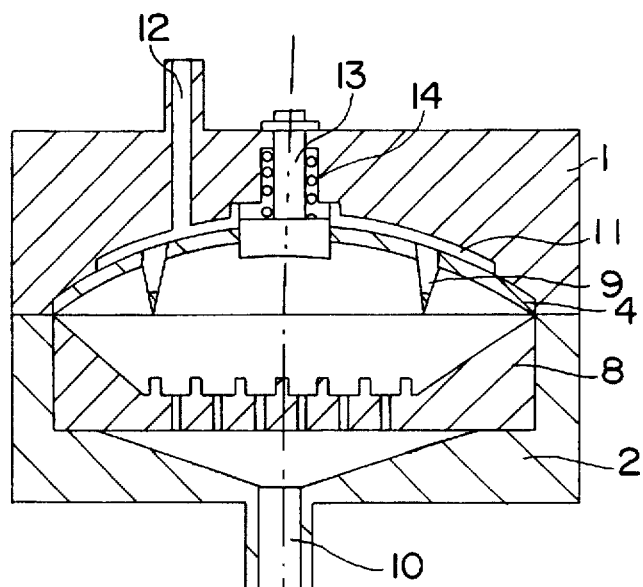
FIG. 1 a section through the essential parts of a brewing head of the invention, the parts comprising a thermally poorly-conducting material according to the invention.

In FIG. 1 all parts of the upper brewing head part 1 that come into contact with the brewing water and the connection line of the hot water generator to the brewing head comprise a thermally poorly-conducting material, for example a suitable plastic, glass ceramic or ceramic.

The same applies to the lower brewing head part 2 and the pyramid plate 8 disposed therein, insofar as the lower part or bottom part is not thermally connected to the hot water generator or its heating element.

Figure 2:
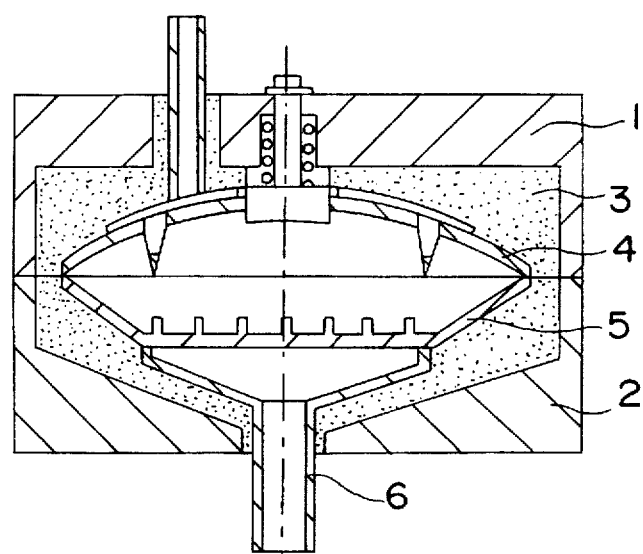
FIG. 2 a section according to FIG. 1 in which the parts that come in contact with the brewing water are characterized by a low thermal capacity.

In FIG. 2 all parts 4 of the upper brewing head part that come into contact with the brewing water are designed structurally to have a low thermal capacity. They are thermally separated from heat-conducting structural elements of the upper part by means of insulation 3.

The same applies to the lower brewing head part 2, the pyramid plate 5 and the discharge region 6 of the lower part insofar as the lower part is not thermally connected to the hot water generator or its heating element.

Figure 3:
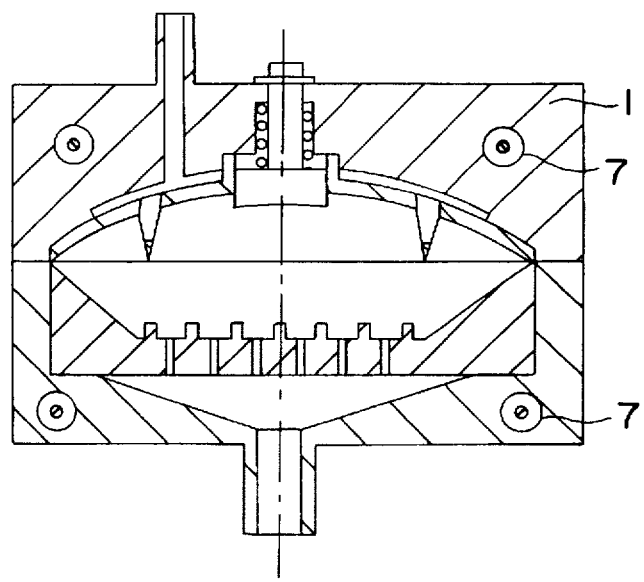
FIG. 3 another section through the brewing head, with the provision of an electric heating element in the upper part.

In FIG. 3 the upwardly-pivotable upper part 1 of the brewing head is equipped with its own, preferably electric post-heating element 7 that heats the upper part to the post-heating temperature prior to the brewing process. The same applies to the lower part 2 with the pyramid plate insofar as it is not thermally connected to the hot water generator or its heating element.

Figure 4:
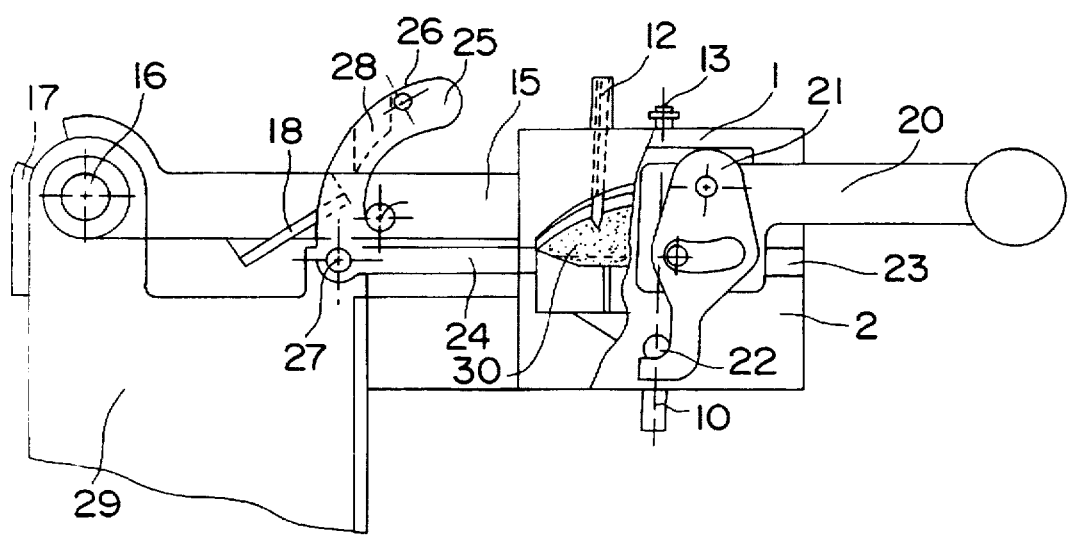
FIG. 4 a partial section through the brewing head, with an expeller arrangement, an ejector arrangement and a locking arrangement, in the closed state.

FIG. 4 shows that the upper brewing head part 1 that supports the needles 9 is provided with an ejector 13 that ejects the used capsule 30 from the needles 9 by means of a spring 14 when the brewing head is opened.

A manually-operated ejector can be used in place of the forced control.

Figure 5:
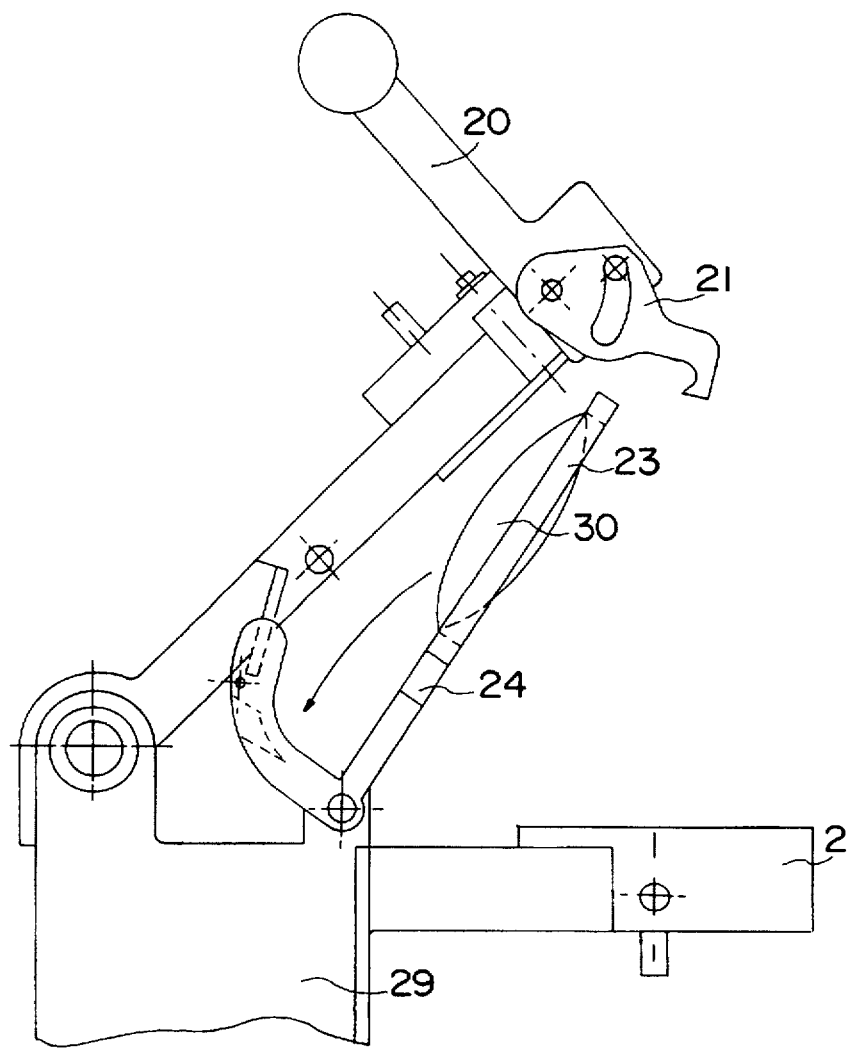
FIG. 5 the open brewing unit.
Figure 6:
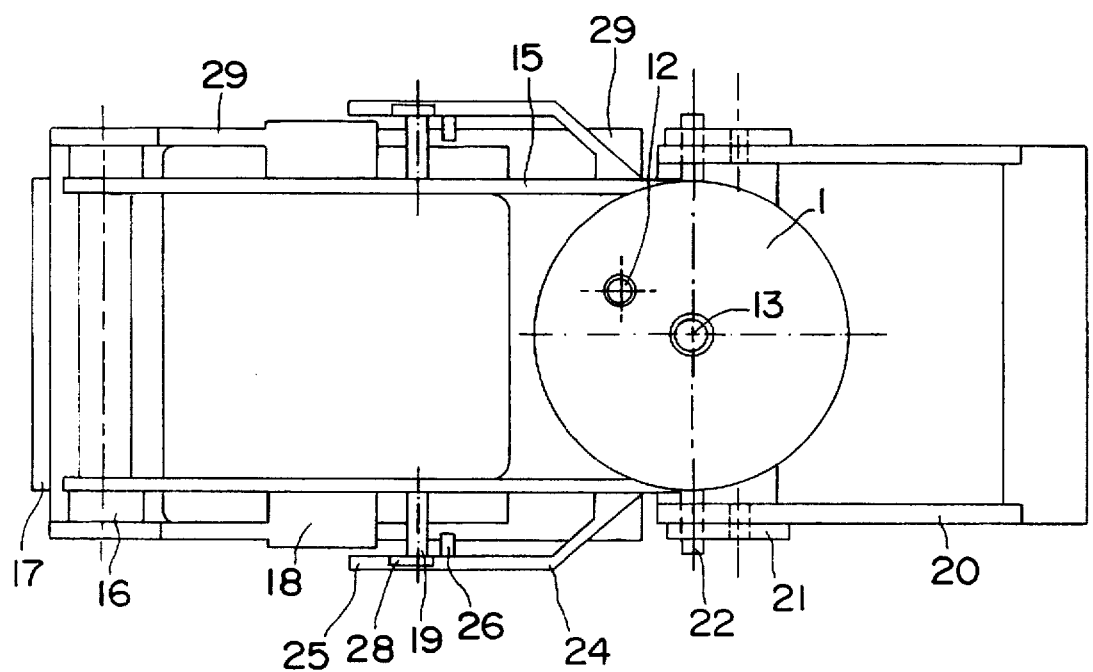
FIG. 6 a plan view of the brewing unit.

The loading of the brewing head is explained below in conjunction with FIGS. 4 through 6.

To load the brewing head with the capsule 30, the brewing head is opened by means of a locking lever 20 and a pivoting arm 15, until a stop 17 at the pivoting arm bearing 16 limits the stroke.

During this pivoting motion, the expeller arrangement is also lifted by means of a lifting pin 19 on the pivoting arm 15 and the wings 25 belonging to the expeller arrangement (comprising the expeller implement 23, expeller arm 24 and expeller wings 25). The lifting pins 19 run out of the curves of the wings 25 at approximately half the height of the stroke, and wing carrier pins 26 run onto angled carrier member 18 of the pivoting arm 15. The expeller arrangement is thus pivoted upwardly until the stroke limit is reached.

When the stroke limit is reached, the wing carrier pins 26 run from the angled carrier member 18 of the pivoting arm 15 (FIG. 5), and the expeller arrangement automatically falls into its initial position according to FIG. 4.

After the capsule 30 has been inserted, the brewing head is closed by means of the locking lever 20 and the pivoting arm 15, and the upper brewing head part 1 and the lower brewing head part 2 are locked together when the locking lever 20 is tipped by means of a locking latch 21 and a locking pin 22.

During downward pivoting, the wings 25 comprising resilient material are caused to travel laterally outwardly by the lifting pins 19 of the pivoting arm 15, which come from above, and run into expansion grooves 28 of the wings 25, so that the pivoting arm 15 can reach its initial position according to FIG. 4 and the lifting pins 19 again lie beneath the wings 25. The above-described brewing process then follows.

To empty the brewing head, the locking is released by upward tipping of the locking lever 20. The brewing head is subsequently opened as in the loading process. This time the used capsule 30 is inside the expeller implement 23.

When the stroke limit 17 is reached, the capsule automatically falls down from the expeller implement 23 and into a disposal vessel, not shown, because of the inclined position of the expeller arrangement and the stop pulse when the stroke limit is reached. The brewing head then remains open or is closed as described.

I claim:

1. A brewing head of an espresso machine, comprising:

a lower brewing head part having a first recess and a coffee discharge conduit formed therein;

an upper brewing head part having a second recess and a hot water conduit formed therein, said upper brewing head part being pivotable relative to said lower brewing head part to a closed position in which the first recess and the second recess form a receptacle that receives a coffee portion capsule, and to an opened position in which the first recess and the second recess are separated from each other so that the coffee portion capsule can be inserted or discharged;

a plurality of hollow needles attached to said upper brewing head part, and being in fluid communication with the hot water conduit, said needles projecting into the receptacle and being penetratable into a top side of the coffee portion capsule for delivering hot water from the hot water conduit into an interior of the coffee portion capsule when said upper brewing head part is in the closed position;

a pyramid plate located within the first recess and having a plurality of projections formed thereon, and a plurality of discharge holes formed therethrough that communicate the receptacle with the coffee discharge conduit, said projections punching holes through a lower side of the coffee portion capsule when the hot water delivered into the interior of the coffee portion capsule is at a pressure that exceeds a resistance of the coffee portion capsule to tearing, so that the hot water together with dissolved coffee components are discharged through the discharge holes and the coffee discharge conduit, respectively;

ejector means located within said upper brewing head part for ejecting a used coffee portion capsule from the hollow needles when said upper brewing head part is in the opened position;

a housing;

a pivoting arm having one end pivotably connected to said housing and another end connected to said upper brewing head part, said pivoting arm being pivotable to pivot said upper brewing head part to the closed and opened positions, said pivoting arm having a lifting pin connected thereto; and expeller means comprising an expeller implement that receives the coffee portion capsule and positions the coffee portion capsule within the receptacle, and an expeller arm having one end connected to said expeller implement and another end pivotably connected to said housing, said expeller means engaging with said lifting pin when said pivoting arm is pivoted to move said expeller means in an upward direction, so that the coffee portion capsule within said expeller implement can fall from said expeller implement for disposal.

2. The brewing head defined in claim 1, wherein said ejector means comprises an ejector located within said upper brewing head part, and a spring connected with said ejector, said spring actuating said ejector when said upper brewing head part is in the opened position.

3. The brewing head defined in claim 1, further comprising a locking lever connected to said pivoting arm, said locking lever having a locking latch that is positionable to lock said upper brewing head part and said lower brewing head part together when said upper brewing head part is in the closed position.

4. The brewing head defined in claim 3, wherein said locking latch is pivotable relative to said locking lever.

5. The brewing head defined in claim 1, wherein all portions of at least one of said upper brewing head part and said lower brewing head part that come into contact with the hot water are comprised of a poor thermally-conducting material.

6. A brewing head of an espresso machine, comprising:

a lower brewing head part having a first recess and a coffee discharge conduit formed therein;

an upper brewing head part having a second recess and a hot water conduit formed therein, said upper brewing head part being pivotable relative to said lower brewing head part to a closed position in which the first recess and the second recess form a receptacle that receives a coffee portion capsule, and to an opened position in which the first recess and the second recess are separated from each other so that the coffee portion capsule can be inserted or discharged; all portions of at least one of said upper brewing head part and said lower brewing head part that come into contact with the hot water have a low thermal capacity;

an insulation separating the portions having said low thermal capacity from any components comprised of thermally-conducting materials;

a plurality of hollow needles attached to said upper brewing head part, and being in fluid communication with the hot water conduit, said needles projecting into the receptacle and being penetratable into a top side of the coffee portion capsule for delivering hot water from the hot water conduit into an interior of the coffee portion capsule when said upper brewing head part is in the closed position;

a pyramid plate located within the first recess and having a plurality of projections formed thereon, and a plurality of discharge holes formed therethrough that communicate the receptacle with the coffee discharge conduit, said projections punching holes through a lower side of the coffee portion capsule when the hot water delivered into the interior of the coffee portion capsule is at a pressure that exceeds a resistance of the coffee portion capsule to tearing, so that the hot water together with dissolved coffee components are discharged through the discharge holes and the coffee discharge conduit, respectively; and ejector means located within said upper brewing head part for ejecting a used coffee portion capsule from the hollow needles when said upper brewing head part is in the opened position.

7. The brewing head defined in claim 6, further comprising a lever connected to said upper brewing head part and being lockable to lock said upper brewing head part and said lower brewing head part together when said upper brewing head part is in the closed position.

8. The brewing head defined in claim 6, wherein at least one of said upper brewing head part and said lower brewing head part have a separate heating element located therein.

* * * * *